(12) United States Patent
Gromann et al.

(10) Patent No.: US 9,725,352 B2
(45) Date of Patent: Aug. 8, 2017

(54) METHOD FOR PRODUCING A TUBE OF GLASS

(71) Applicant: Heraeus Quarzglas GmbH & Co. KG, Hanau (DE)

(72) Inventors: Boris Gromann, Aschaffenburg (DE); Nigel Whippey, Seligenstadt (DE)

(73) Assignee: Heraeus Quarzglas GmbH & Co. KG, Hanau (DE)

(*) Notice: Subject to any disclaimer, the term of this patent is extended or adjusted under 35 U.S.C. 154(b) by 0 days.

(21) Appl. No.: 14/974,038

(22) Filed: Dec. 18, 2015

(65) Prior Publication Data

US 2016/0176747 A1 Jun. 23, 2016

(30) Foreign Application Priority Data

Dec. 19, 2014 (EP) .................................. 14199489

(51) Int. Cl.
 *C03B 23/053* (2006.01)
 *C03B 23/07* (2006.01)
 *C03B 23/08* (2006.01)
(52) U.S. Cl.
 CPC ............ *C03B 23/053* (2013.01); *C03B 23/07* (2013.01); *C03B 23/08* (2013.01)
(58) Field of Classification Search
 CPC . C03B 23/04; C03B 23/043053; C03B 23/07; C03B 23/11
 See application file for complete search history.

(56) References Cited

U.S. PATENT DOCUMENTS 6,016,669 A * 1/2000 Correa .................. C03B 23/043
 264/573

FOREIGN PATENT DOCUMENTS

| CN | 102887626 A | 1/2013 |
|---|---|---|
| JP | H10101353 A | 4/1998 |
| JP | 2004149325 A | 5/2004 |

OTHER PUBLICATIONS

Search Report and Opinion issued Jun. 16, 2015 in EP Application No. 14199489.7.

* cited by examiner

*Primary Examiner* — Lisa Herring
(74) *Attorney, Agent, or Firm* — Panitch Schwarze Belisario & Nadel LLP

(57) ABSTRACT

A method for forming a hollow cylinder, in a single step or in as small a number of steps as possible, into a quartz glass tube with a large outer diameter and high dimensional stability is provided. The cylinder, while rotating about a rotation axis, is softened in portions in a heating zone which is moved at a relative feed rate Va, and the softened portion is radially expanded by a centrifugal force and/or an internal overpressure applied in the hollow cylinder bore so as to form a deformation zone. The tube is continuously shaped with an outer diameter D2 which is greater than that of the hollow cylinder D1. The radial expansion of the softened portion is carried out at a location-dependent radial expansion rate Vr, the profile of which along the deformation zone has a maximum value Vr,max which is smaller than two times the feed rate Va.

9 Claims, 5 Drawing Sheets

METHOD FOR PRODUCING A TUBE OF GLASS

BACKGROUND OF THE INVENTION

The present invention relates to a method for producing a tube of glass, particularly of quartz glass, by forming a hollow cylinder from the glass with an outer diameter $D_1$ in that the cylinder, while rotating about a rotation axis, is softened in portions in a heating zone which is moved at a relative feed rate Va, and the softened portion is radially expanded under the action of a centrifugal force and/or of an internal overpressure applied in the hollow cylinder bore so as to form a deformation zone, and the tube is continuously shaped with an outer diameter $D_2$ which is greater than $D_1$.

With such methods and apparatuses, hollow cylinders of glass, particularly of quartz glass, are formed in one or plural hot forming steps into tubes, the radial tube dimensions being changed with respect to the radial dimensions of the hollow cylinder or the cross-sectional profile. An initial hollow cylinder which is rotating about its longitudinal axis is here softened zone by zone and is expanded in this process—under the action of a radially outwardly directed force—either against a molding tool, which is arranged at a predetermined radial distance relative to the longitudinal axis of the tube, or it is formed without tools. The radially outwardly directed force is based on the centrifugal force and/or on an internal overpressure in the inner bore of the hollow cylinder (also called "blow pressure").

Special attention is here paid to the dimensional stability of the drawn-off tube strand. To ensure this stability, constant detection and continuous control of a radial dimension of the tube strand, such as the outer diameter, the inner diameter or the wall thickness, are indispensable. The blow pressure, the relative feed rate between hollow cylinder and heating zone, and the temperature in the heating zone are common as a control variable of such a control.

Dimensional deviations that already exist in the original hollow cylinder tend to propagate into the drawn-off glass tube during the forming process and are even intensified in this process. Variations in the radial cross-sectional profile or wall one-sidedness; i.e. radially irregular profiles of the tube wall thickness, also called "siding" among the experts, are here particularly disadvantageously noticed. Since upon use of a molding tool, the outer diameter is a relatively fixed given dimension, tube wall one-sidedness is here accompanied by variations in the inner diameter of the tube.

These problems increase with an increasing end diameter of the tube, for wall thickness variations found in the start cylinder exponentially grow with the diameter in the forming process. Therefore, in the final analysis, the maximum values for siding that can still be tolerated according to the specification (e.g., 1 mm) limit the virtually achievable end diameter of the tube. This effect also depends on the level of the blow pressure, so that this pressure cannot be arbitrarily high. Instead of this, in order to achieve commercially acceptable forming rates, the glass must be heated to a higher degree and softened more strongly. This, in turn, leads to more drawing streaks or other defects in the glass wall and to an increased energy demand, especially in the case of large-volume tubes (also called "large tubes" hereinafter) which cool down very rapidly because of their large volume.

The greater the end diameter of the tube, the more difficult and more cost-intensive is therefore the production of a dimensionally stable large tube. To mitigate this problem, it is suggested in JP 2004-149325 A that the forming process should be subdivided into a plurality of forming stages with successive increase in the diameter. For this purpose, the hollow cylinder of quartz glass to be formed, which has a diameter of 250 mm, is clamped in a lathe and is rotated about its horizontally-oriented longitudinal axis while it is heated by means of a ring-shaped arrangement of heating burners and is softened zone by zone in that the heating burners are moved at a predetermined feed rate Va along the cylinder surface. The increase in diameter is due to the centrifugal force acting on the softened portion. The deformation zone will migrate along the whole start cylinder once until the cylinder is fully expanded. The outer diameter of the tube is here continuously captured by means of a laser beam without tools. This forming step will be repeated until the nominal tube diameter of 440 mm is reached. In each forming step, the tube diameter is increased by 15 mm.

CN 102887626 A describes a multi-stage forming process for producing a quartz glass tube with an outer diameter of more than 520 mm with forming stages of 60 mm each.

In this forming process, one achieves a comparatively small forming degree in each individual forming stage, which is accompanied by a smaller deviation from the nominal value of a radial tube dimension. Moreover, each forming stage offers the possibility of considering and correcting dimensional deviations found in the respective start cylinder.

On the other hand, it is evident that this procedure requires a lot of time and energy, especially since the tube cools down between successive forming steps.

The attempt can be made to keep the number of the forming steps as small as possible in that the respective deformation degree, i.e. the change in diameter, is set as high as possible. It has, however, been found that the forming process in the case of very great diameter changes becomes unstable, which first manifests itself in diameter variations that form a wave structure extending in the longitudinal axis direction.

BRIEF SUMMARY OF THE INVENTION

It is an objective of the present invention to provide a method which makes it possible to form a hollow cylinder in a single forming step or in a number of forming steps, which number is as small as possible, into a glass tube with a large outer diameter and high dimensional stability.

This objective is achieved according to the present invention in that the radial expansion of the softened portion is carried out at a location-dependent radial expansion rate Vr, the profile of which, along the deformation zone, has a maximum value Vr,max which is smaller than 2 times the feed rate Va.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings.

DETAILED DESCRIPTION OF THE INVENTION

Figure 1:
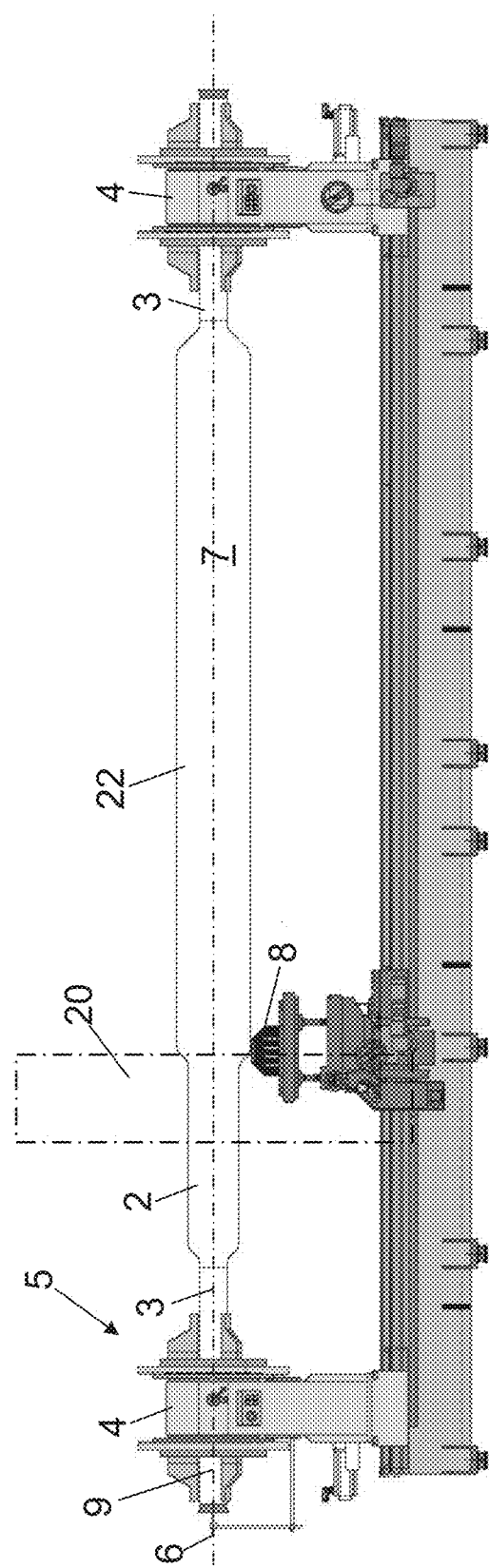
FIG. 1 is a side view and a schematic representation of an apparatus for forming a hollow cylinder of quartz glass into a quartz glass tube, according to an embodiment of the present invention.

In the deformation portion (here also called "deformation zone"), the diameter of the softened glass strand is continuously increasing from the hollow cylinder to the tube in response to the deformation resistance of the glass, which is specifically determined by wall thickness and viscosity. In a longitudinal section, the deformation portion has a funnel shape on the whole, with an S-shaped transition, when viewed in section, between cylinder and tube, which will also be called "shoulder" hereinafter.

It has been found that the aforementioned process instability will begin and the wave structure will be formed whenever the deformation rate of the glass in radial direction (here also called "radial expansion rate") becomes too great in comparison with the initial value at the beginning of the radial deformation. The radial expansion rate is proportional to the ratio of the outer diameter of the tube to the wall thickness of the tube. This means that the radial expansion rate is the greater, the greater the outer diameter of the tube and the smaller its wall thickness are. The outer diameter is increasing from the beginning to the end of the deformation portion, and the wall thickness is normally decreasing, but it may also remain approximately the same. That is why, without any counter-measures and at the same temperature, the radial expansion rate is increasing from the beginning of the deformation portion to the end. At a constant relative rate between heating zone and hollow cylinder, this will have the outcome that the slope in the area of the "shoulder" is getting steeper and steeper. This, however, reduces the convective heat input into the glass from the radial direction, which effects a relative local cooling and thus a decrease in the local radial expansion rate. The "shoulder" thereby becomes flatter again and the radial heat radiation input into the glass and the local temperature become higher again, so that the local radial expansion rate is increasing again and the mechanism starts anew. The system oscillates, thereby causing the circulating waves.

The basic idea for avoiding this process instability is now to counteract the occurrence of an excessive radial expansion rate in the deformation portion.

A high radial expansion rate Vr is harmless if the deformation zone is also moving at a high rate; i.e. if the axial feed rate Va is high. The feed rate is normally kept constant throughout the forming process. Therefore, a measure of the degree of the radial expansion rate at a given feed rate is the slope of the "shoulder" in the deformation region. The shoulder is the steeper, the greater the ratio between radial expansion rate and axial feed rate. In other words, the slope of the shoulder follows from the ratio of the rates Vr/Va, wherein Vr refers to the expansion of the radius; i.e. half the diameter.

It has been found that process fluctuations are avoided if this ratio is smaller than 2, or even better smaller than 1.5, preferably smaller than 1, and particularly preferably smaller than 0.7. The maximum radial expansion rate Vr,max is here preferably smaller than 20 cm/min, particularly preferably smaller than 10 cm/min.

The forming of the hollow cylinder is based on the blow pressure or on the centrifugal force during rotation (centrifugation) or on both effects. The tangential tension σT which is operative in the tube wall is composed of the following two constituents, of which the first one describes the effect of the blow pressure, and the second one the effect of the centrifugal force.

$$\sigma T = p \cdot r / WD + \rho \omega^2 r^2 \quad (1)$$

where: p=pressure, r=radius in the forming portion, WD=wall thickness, ρ=specific density of the glass, ω=angular velocity.

The tangential tension which is operative in the tube wall (without centrifugation; only blow pressure) produces the radial expansion in the deformation zone, i.e.:

$$\sigma_T = \eta_D \frac{d\varepsilon}{dt} \left( \eta_D: \text{extensional viscosity}, \varepsilon \approx \frac{r - r_0}{r_0} \right) \quad (2)$$

Thus, the following applies to the expansion rate of the glass in radial direction (and based on the radius):

$$\frac{d\varepsilon}{dt} = \frac{\sigma_T}{\eta_D} \quad (3)$$

Thus, the viscosity of the glass is a parameter suited for varying the local deformation rate, because the deformation rate is inversely proportional to the viscosity, and the latter depends on the temperature of the glass. Thus, it is suggested as a suitable measure for the solution of the problem and for varying the maximum value of the radial expansion rate Vr, that the temperature profile acting on the tube strand along the deformation portion should be adapted such that the difference of the deformation rate in radial direction (of the radial expansion rate) between beginning and end should be kept as small as possible; ideally, a rise is completely compensated by the temperature profile.

It has been found to be advantageous, in this respect, when in the heating zone, a temperature profile is generated that along at least a sub-length of the deformation zone has a course opposite to a profile of the tangential tension along the same sub-length.

Differences in the profile of the tangential tension along the sub-length, and thus differences in the radial expansion rate, are here compensated completely or at least in part by the temperature profile, with the aim to set a radial expansion rate which is as constant as possible along the sub-length. As a rule, this aim is reached all the more completely, the greater the corresponding sub-length of the deformation zone is, in which the temperature profile and the profile of the tangential tension are opposite to each other. Ideally, the sub-length is therefore the whole length of the deformation zone. However, it is also enough to concentrate on the particularly critical area around the middle of the deformation zone; e.g. the middle third of the deformation zone. The temperature profile within the heating zone is, for example, obtained on the basis of the nominal heating output curve during operation, or it is determined by measurement of the surface temperature on the tube to be formed.

The calculation of an "inverse" temperature profile which completely compensates the profile of the tangential tension is carried out on the basis of the above equations (1) to (3).

The radial expansion rate Vr is proportional to the ratio tangential tension/viscosity, i.e.:

$$d\epsilon/dt = \sigma/\eta = 2 \cdot \pi \cdot V_r$$

For the tangential tension: $\sigma_T = (p \cdot r)/WD + \rho\omega^2 r^2$

Viscosity and its temperature dependence are glass-specific. For the viscosity $\eta$ of quartz glass, the following dependence $\eta(T)$ is applicable:

$$lg = \eta = 1.6 + 8487/(T[°C.] - 390) \text{ (in Pas)}$$

Thus, under the condition of a constant expansion rate Vr, one obtains the following for the "inverse" temperature profile:

$$T = \frac{8487}{lg\left(\frac{\frac{p \cdot r}{WD} + \rho\omega^2 r^2}{2 \cdot \pi \cdot V_r}\right) - 1.6} + 390 \quad (4)$$

In practice, a complete compensation of different radial expansion rates is not required most of the time. The profiles of temperature and tangential tension are not required to be exact mirror images or to be inverse or opposite. In simple cases, the demand on the inversion of the profiles is satisfied if in the case of a profile in which the tangential tension increases in the direction of the tube, the temperature decreases in the same direction. Or in the case of a profile in which the tangential tension at an axial position along the sub-length of the deformation zone under consideration has a maximum, the temperature profile at this axial position has a minimum.

Figure 3:
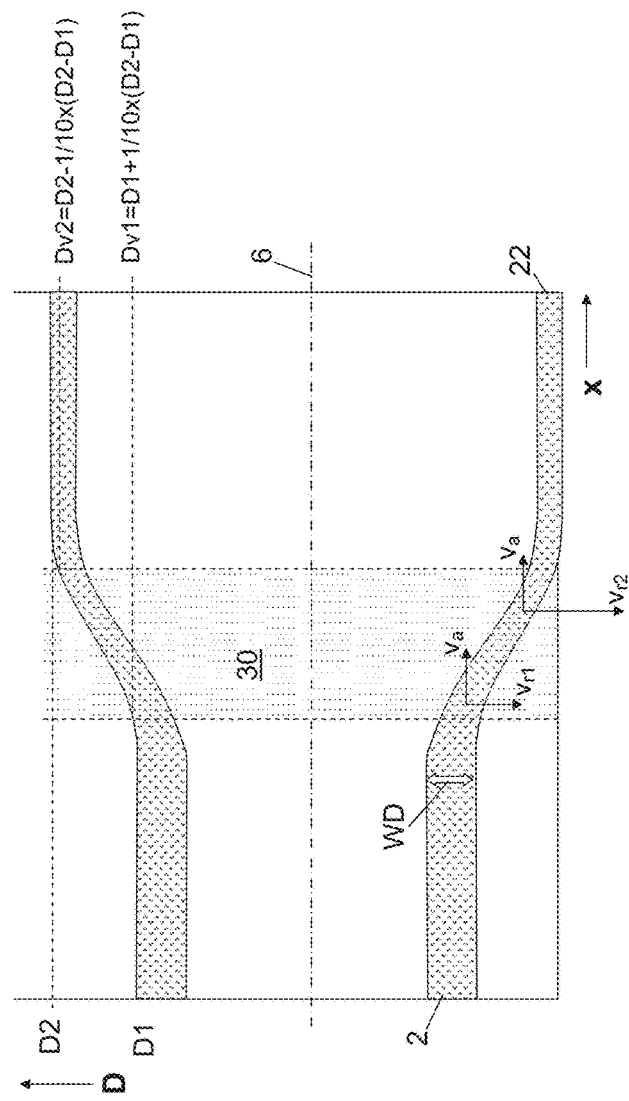
FIG. 3 is a graphical sketch demonstrating parameters of the forming process, according to an embodiment of the present invention.

Due to a decreasing wall thickness, a particularly high radial expansion rate would have to be expected in the case of a homogenous temperature profile along the deformation zone at the end thereof. The sketch of FIG. 3 schematically shows the area of the deformation zone 30 between hollow cylinder 2 and tube 22 in a diagram. Diameter D is here plotted on the ordinate, and the longitudinal axis position x on the abscissa. For the purpose of explaining the effect of undesired great differences in the radial expansion rate, the hollow cylinder 2 which is rotating about the longitudinal axis 6 has a greater wall thickness than the drawn-off tube 22, resulting in a reduction of the wall thickness along the deformation zone 30. The deformation zone 30 is here gray-shaded.

The "beginning" of the deformation zone 30 is defined as that x-position at which the following applies to the location-dependent outer diameter Dv of the deformation zone: $D_{v1} = D1 + \frac{1}{10}x(D2-D1)$. Thus the "end" of the deformation zone marks that x-position at which the following applies to the location-dependent outer diameter $D_V$ of the deformation zone: $D_{v2} = D2 - \frac{1}{10}x(D2-D1)$.

In the front region of the deformation zone 30, with a comparatively large wall thickness WD, a radial expansion rate which is represented by the vector $v_{r1}$ is obtained on the basis of the above equations (1) to (3). By comparison, a comparatively higher radial expansion rate is obtained in the rear region of the deformation zone 30, with a thinner wall thickness WD—at a constant feed rate $v_a$, as indicated by the longer vector $v_{r2}$.

To counteract this, the temperature toward the end of the deformation zone is preferably lower than at the beginning of the deformation zone. The temperature difference between end and beginning of the deformation zone is here at least 20° C.

To generate a non-homogeneous temperature profile along the deformation zone, the heating zone is subdivided into two or more heating portions that are heatable independently of each other. In a particularly preferred embodiment, it is intended that the heating zone has a front heating portion assigned to the beginning of the deformation zone and a rear heating portion assigned to the end of the deformation zone, with a higher temperature being generated on the surface of the deformation zone by means of the front heating portion than by means of the rear heating portion.

Ideally, the radial expansion rate between the beginning (Dv1) and the end (Dv2) of the deformation region is constant. In practice, it has been found to be useful that the radial expansion rates at the positions differ by not more than 50% (based on the smaller one of the two values).

A further parameter for varying the local radial expansion rate is the wall thickness of the drawn-off glass strand. The thicker the tube wall, the greater is the deformation resistance to radial expansion at the same viscosity. The radial expansion rate is inversely proportional to the wall thickness. It is determined by the ratio of the speed at which the hollow cylinder passes into the heating zone and the speed at which the tube is removed from the heating zone. If this speed ratio is smaller than 1, the quartz glass tube is not elongated, but is subjected to compression. This causes a thickening predominantly on soft and thin wall portions; i.e. on wall portions of a high radial expansion rate. Ideally, the wall thickness over the deformation region is kept approximately constant and the forming process is thereby stabilized and an exact setting of the outer diameter is enabled.

Therefore, in a preferred method variant, it is intended that the forming process includes at least temporarily a compression phase during which the ratio of a speed at which the hollow cylinder moves into the heating zone and a speed at which the tube is removed from the heating zone is smaller than 1.

Holders are here welded on the front side to the hollow cylinder to be formed, and these are clamped in a chuck of a glass lathe and rotated in synchronism. A heating source is moved zone by zone along the hollow cylinder. A defined internal pressure can be set in the inner bore of the cylinder. Due to the rotation and driven by the centrifugal force and the internal pressure, the inner bore expands without the chuck having to be moved apart for this purpose. The hollow glass cylinder can also be compressed in the forming process in the direction of the rotation axis, wherein the wall thickness of the tube after compression is between 70% and not more than 100% of the wall thickness prior to compression. The aim is here a diameter increase in the glass tube while the wall thickness thereof is largely maintained. Although a compressing process which leads to an increase in the wall thickness (>100%) is possible, it leads to undesired deformations.

The gas consumption for producing the blow pressure depends on the degree of the blow pressure. At a high blow pressure it is lower than at a low blow pressure. A high blow pressure is therefore desired. However, when high demands are made on dimensional accuracy and process stability, a procedure is preferred in which the blow pressure is set to less than 20 mbar, preferably to less than 10 mbar.

It has here been found that a high blow pressure can impair the process stability. The tangential tension $\sigma T$ which is operative in the tube wall is mathematically described on the basis of the above equation (1). The first term of this equation which describes the effect of the blow pressure depends on the wall thickness WD of the quartz glass tube. The thinner the wall, the more significant gets this term. This is shown by the diagram in FIG. 4. On the ordinate, the tangential tension $\sigma_T$ (N/m²) is plotted against the outer diameter D (m) of a tube of quartz glass to be produced. The starting point is an initial tube with an outer diameter of 197 mm and a wall thickness of 7.5 mm. Curve A shows the increase in the tangential tension with the end diameter of the tube when the blow pressure is substantially used for tube enlargement; i.e., when the rotational speed is approaching zero. Curve B shows the increase in the tangential tension with the end tube diameter when the diameter is exclusively enlarged by way of the centrifugal force; i.e., at a rotational speed of 90 rpm. By comparison, curve C also shows a diameter enlargement just by way of the centrifugal force, but at a lower rotational speed of 25 rpm.

It becomes apparent that the tangential tension which is operative in the wall of the quartz glass tube strongly depends on the blow pressure in the forming process. This has the consequence that wall thickness deviations found in the start cylinder are intensified in the deformation process under the action of blow pressure because a thinner wall is here subjected to a higher tangential tension than a thicker wall. By comparison, this intensifying effect is smaller in a forming process with a purely centrifugal force because the wall thickness has here no influence on the increase in tangential tension, but just the increased rotational speed, as shown by the comparison of curve B with curve C.

With the help of the formerly known forming processes, diameter variations $(D_2-D_1)$ of more than 40 mm were not possible in the forming of hollow cylinders of quartz glass without the acceptance of forming flaws. Such diameter changes can be handled without any problems with the method according to the present invention. Even at diameter changes of 120 mm in a single forming step, there have been no inhomogeneities in the drawn-off tube strand or instabilities in the process sequence. Hence, in the method according to the present invention, great diameter changes of 70 mm and more and even of 100 mm and more are preferred in a single forming step.

Hence, the above-mentioned technical objective, starting from a method of the aforementioned type, is achieved according to the present invention also in that Vr,max is smaller than 20 cm/min and that the radial expansion of the softened region is carried out such that the tube is provided with an outer diameter $D_2$ that is greater by at least 70 mm than $D_1$.

A high stability in the forming process is achievable when a small radial expansion rate of less than 20 cm/min, preferably less than 10 cm/min, is observed. It is thereby possible to set a diameter change of 70 mm or more, preferably more than 100 mm, in a single forming step, so that a particularly economic forming process with a few forming steps is possible also in the case of great diameter changes. Ideally, only a single forming step is required. Specifically, it is thereby possible to produce large tubes of quartz glass with outer diameters of more than 500 mm with acceptable energy expenditure and without pronounced drawing streaks and tolerable siding.

A process variant is preferred in which in the heating zone a temperature is generated that along at least a sub-length of the deformation zone has a course which is opposite to a profile of the tangential tension along the same sub-length.

Further preferred developments of this procedure correspond to those as have been described and explained above for the procedure in which the relationship Vr,max<2Va is applicable to the maximum value of the location-dependent radial expansion rate Vr, max and the feed rate Va.

FIG. 1 schematically shows an apparatus for forming a hollow cylinder 2 of quartz glass into a large tube 22. The forming process comprises several forming steps in which the respective initial hollow cylinder is successively formed into the desired large tube 22 with an outer diameter of 960 mm and a wall thickness of 7.5 mm.

Figure 2:
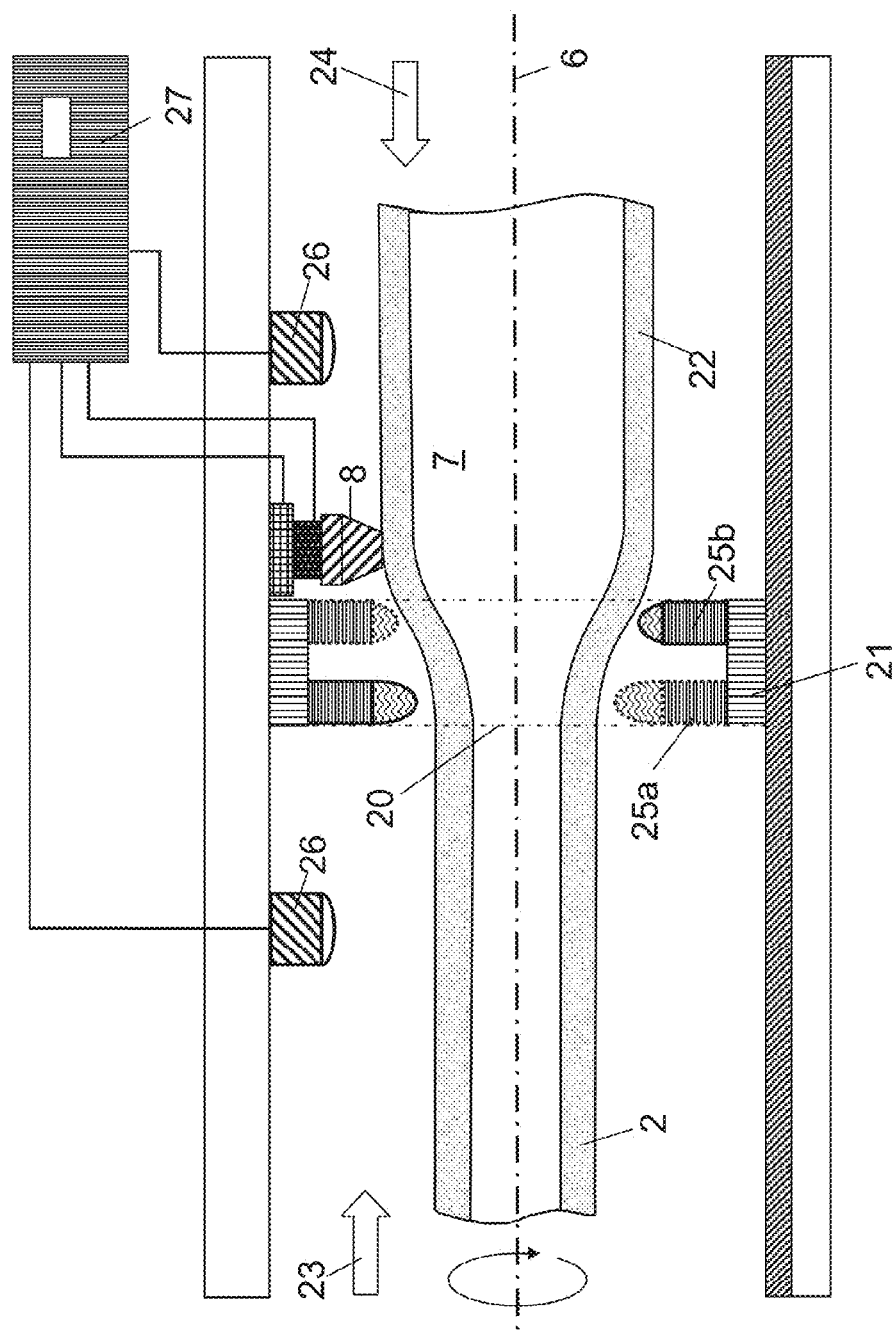
FIG. 2 is schematic representation of a section of the apparatus of FIG. 1 with additional constructional details.

Holding tubes 3 are welded onto the front sides of the hollow quartz-glass cylinder 2 to be formed. The holding tubes 3 are clamped into a chuck 4 of a horizontal glass lathe 5, and are rotating in synchronism around the rotation axis 6. A burner carriage 21 (see FIG. 2), on which several burners are distributed in the form of a ring around the outer circumference of the hollow cylinder 2, is moved from one hollow cylinder end to the other end and thereby heats the hollow cylinder 2 of quartz glass zone by zone and over the whole circumference thereof. The burner carriage 21 is symbolized in FIG. 1 by a dash-dotted circumferential line 20, illustrating the heating zone. FIG. 2 schematically shows a detail thereof. The inner bore 7 of hollow cylinder 2 and large tube 22 can here be flushed with gas through a gas inlet 9, and a defined internal pressure can be set. Driven by the centrifugal force and the internal pressure, the outer wall of the tube comes to rest on a molding of graphite 8, which is moved together with the burner carriage 21.

The burner carriage 21 which moves along the initial hollow cylinder 2 from the left to the right, as illustrated by directional arrow 23, is visible from the detail shown in FIG. 2. Two burner rings 25a, 25b that rotate in parallel around the rotation axis 6 and that serve to heat and soften the initial cylinder 2 are mounted on the burner carriage 21 one after the other. The two burner rings 25a, 25b are spaced apart in axial direction (6) by 50 mm and are adjustable in their heating output independently of each other. Each of the burner rings 25a, 25b is formed of five gas burners that are evenly distributed around the longitudinal axis 6 of the cylinder, wherein, viewed in circumferential direction, the individual burners of the burner rows 5a, 25b are arranged offset to one another.

EXAMPLE

Due to the advance movement of the burner carriage 21 at a speed of 4 cm/min, the hollow cylinder 2, while rotating about its longitudinal axis 6 (which corresponds to the rotation axis) at a speed of 60 rpm, is heated continuously under the action of the burner rings 25a, 25b to a high temperature of around 2,100° C. In the rear burner ring 25b, a smaller heating output is generated than in the front burner ring 25a, resulting in a total heating output density that will be explained in more detail further below with reference to FIG. 5. To achieve a radial expansion rate that is as constant as possible along the deformation zone, the axial profile of the heating output curve is here decisive (not so much the absolute value).

The inner bore 7 can here be flushed with a gas, and a defined and controlled internal pressure of up to about 100 mbar is here set in the inner bore 7. In the embodiment, a blow pressure of 15 mbar is applied.

The quartz glass is given such a low viscosity through the heating up in the burner rings 25a, 25b that it deforms solely under the action of centrifugal force and internal pressure and without use of a molding tool into the tube 22. The forming process is thus without any tools. In support, the outer tube wall comes to rest on a molding 8 of graphite.

For the wall thickness measurement, cameras 26 are arranged in the area of the start cylinder 2 and in the area of the drawn-off quartz glass tube 22. The cameras 26 are connected to a computer 27 which includes a wall thickness control. While the tube strand is rotating, the cameras 26 are able to continuously produce a wall thickness profile that is evaluated in the computer 27, such that the amount of wall one-sidedness (maximum value minus minimum value of the wall thickness) and the circumferential position of the minimum wall thickness and the maximum wall thickness over the outer circumference are determined.

In the forming process, an additional elongation does not take place automatically. The start cylinder is often even compressed such that the inflated quartz glass tube 22 has about the same wall thickness as the hollow cylinder 2. In the present embodiment, there is a compression of 15%; i.e., the cross-sectional area of the tube 22 is 15% greater than the cross-sectional area of the hollow cylinder 2.

The radial expansion rate is determined on the basis of the above equations (1) to (3); it is set such that even in the maximum it is lower than 8 cm/min. For the density of quartz glass, the value 2200 kg/m$^3$ is used, and for the viscosity η of quartz glass, there is the following equation:

$$lg\,\eta = 1.6 + \frac{8487}{T[°C.] - 390} Pas$$

The quartz glass tube 22 obtained in this way can serve as an initial hollow cylinder for a further forming process. The original hollow cylinder 2 is thereby enlarged in steps into a large tube of quartz glass, wherein each forming step represents a diameter enlargement of 120 mm. The outer diameter of the burner rings 25a, 25b and the work distance of the molding tool 8 are here adapted to the respective outer diameter of the forming step.

This method yields a large tube of synthetic quartz glass or of quartz glass of naturally occurring raw material with an altogether high dimensional stability in an economic way. The wall thickness variation of the large tube of quartz glass produced thereby is less than 1 mm per tube length meter.

Figure 4:
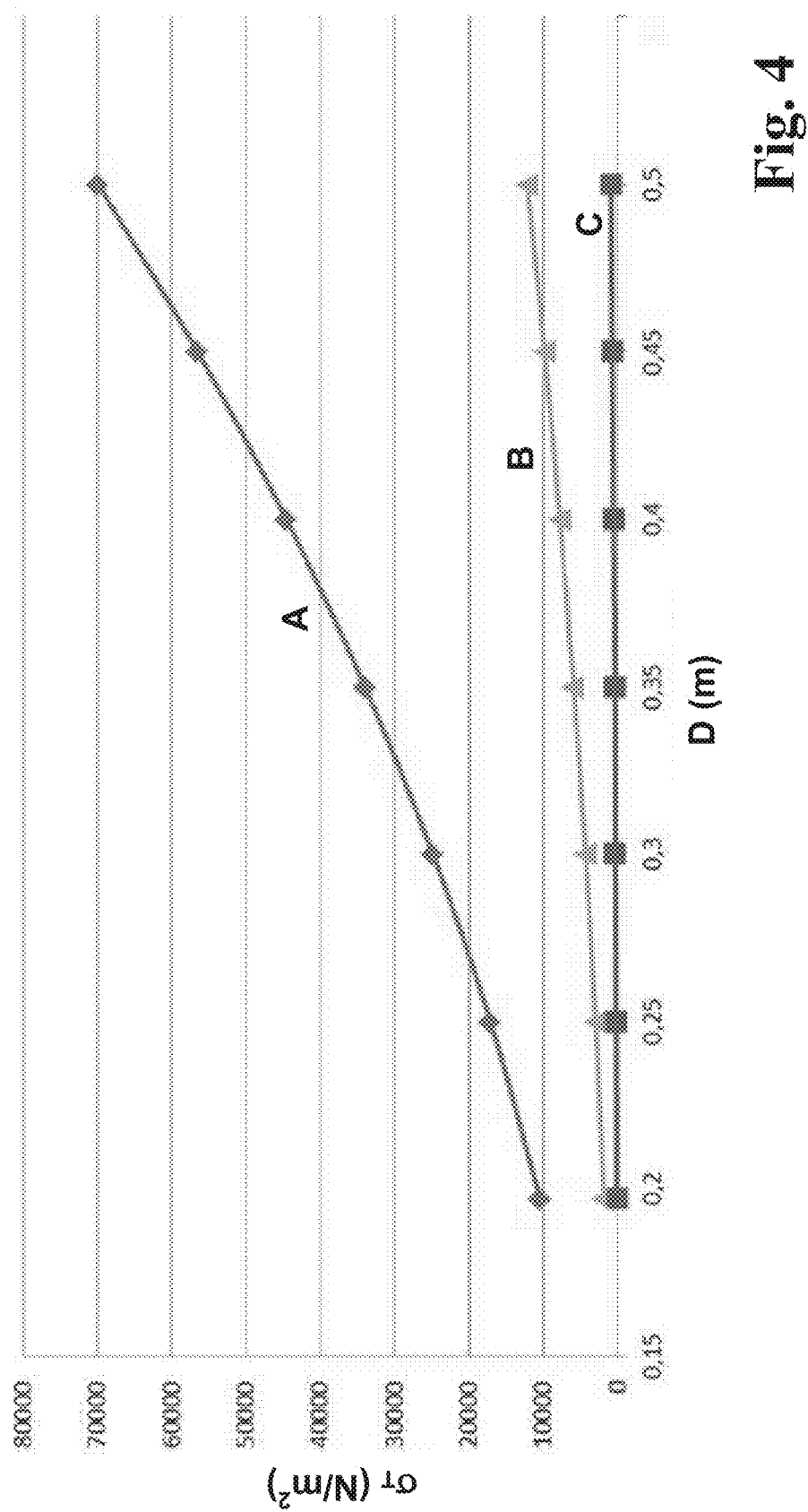
FIG. 4 is a diagram demonstrating the influence of blow pressure and centrifugal force on tangential forces in the wall of a tube during the forming process.

The diagram of FIG. 4 demonstrates the influence of the blow pressure on wall thickness variations. On the ordinate, the tangential tension σ (N/m$^2$) is plotted against the outer diameter D (m) of the quartz glass tube to be produced. An initial tube with an outer diameter of 197 mm and with a wall thickness of 7.5 mm is started from. Curve A shows the increase in the tangential tension with the end diameter of the tube if the blow pressure is largely used for tube enlargement; i.e., if the rotational speed is approaching zero. Curve B shows the increase in the tangential tension with the end tube diameter when the diameter is exclusively enlarged by way of the centrifugal force; i.e., at a rotational speed of 90 rpm. By comparison, curve C also shows a diameter enlargement just by way of the centrifugal force, but at a lower rotational speed of 25 rpm.

It is evident that the tangential tension which is operative in the wall of the quartz glass tube considerably depends on the blow pressure in the forming process. This has the effect that wall thickness deviations found in the start cylinder are intensified in the deformation process under the action of blow pressure because a thinner wall is here exposed to a higher tangential tension than a thicker wall. By comparison, this intensifying effect turns out to be smaller in a forming process with a purely centrifugal force because the wall thickness has here no influence on the increase in the tangential tension, but just the increased rotational speed, as is shown by the comparison of curve B with curve C.

Figure 5:
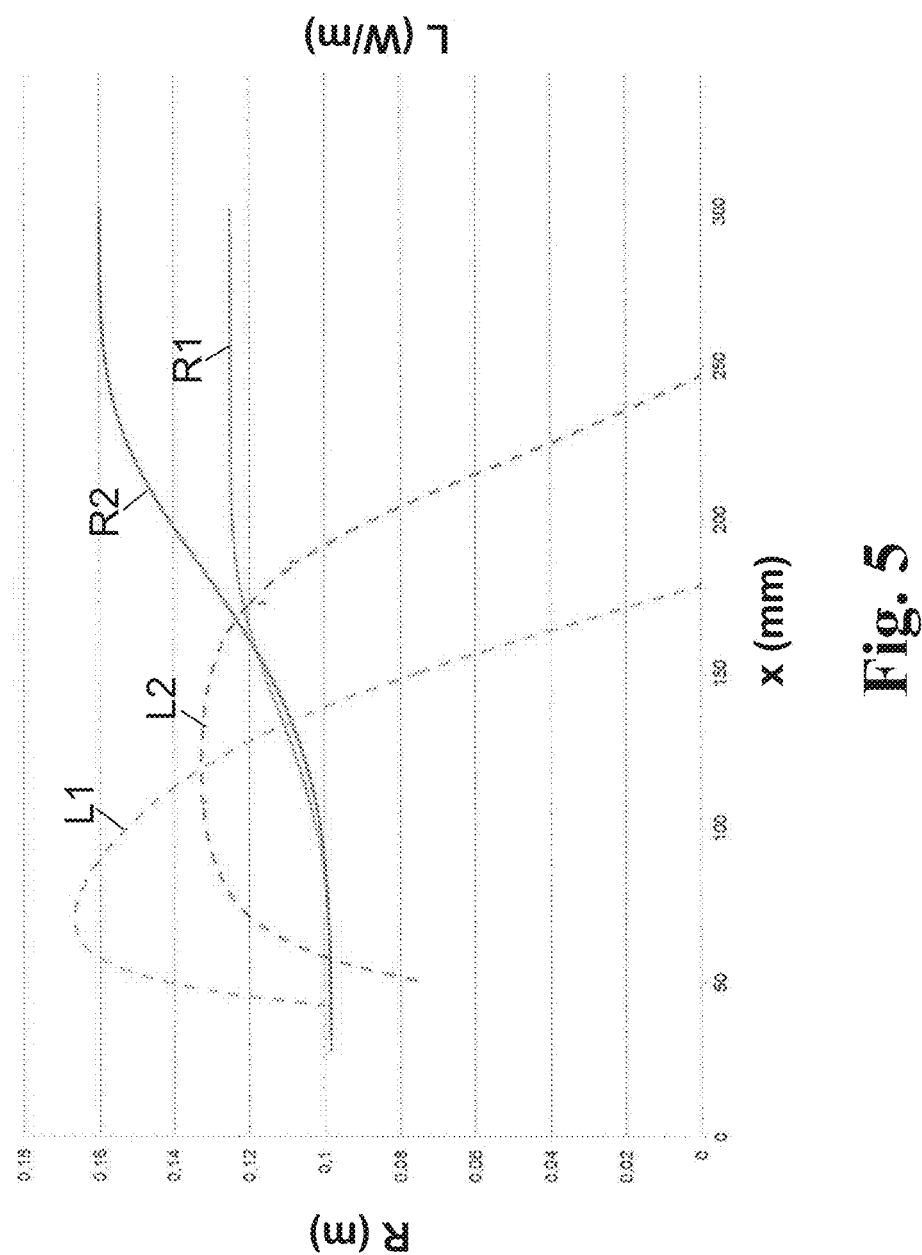
FIG. 5 is a diagram demonstrating the dependence of the geometrical shape of the deformation zone on the power density input.

FIG. 5 shows a diagram demonstrating the influence of the temperature in the area of the deformation zone on the geometric design thereof. On the left ordinate, the radius R in [m] of the "shoulder" is plotted against the longitudinal axis position x in [mm], and the power density L in (W/m) on the right ordinate.

The diagram shows two pairs of curves by way of comparison. In the pair of curves L1/R1, the radius course R1 of the shoulder was determined on the basis of a formerly usual distribution of the power density L1. The pair of curves L2/R2 shows the effect of an adaptation of the distribution of the power density L2 according to the present invention on the radius course R2 of the shoulder.

It must here be noted that the profile of the power input is not identical to the temperature profile because the heat in the glass is further transported and is, so to speak, added up. That is why the power input always ends approximately on the turning point of the shoulder; i.e., at the steepest point thereof. The illustrated power profile L2 is obtained when the associated temperature profile is adapted such that the radial deformation rate within the deformation zone is approximately constant. This adaptation leads to a broader distribution of the power density.

The adaptation in the pair of curves L2/R2 refers to the axial temperature distribution, and it aims at compensating the tangential tension changing along the deformation zone (30) in such a manner that a radial expansion rate that is as constant as possible is obtained along the entire deformation zone (30). At any rate, the radial expansion rate does not exceed the above-mentioned maximum value of 8 cm/min.

The calculation of the corresponding axial temperature profile is carried out on the basis of the above-indicated equation (4). It is thereby ensured that the temperature profile at an axial position along the deformation zone has a minimum at which the profile of the tangential tension has a maximum.

Moreover, it has been found that the comparatively broader distribution of the power density L2, despite a much lower maximum value (about 230.00 W/m in comparison with about 260.00 W/m at L1), effects a much greater end radius at R2 (about 0.160 m in comparison with about 0.125 m at R1). It is also visible that the slope within the shoulder contour of R2 is approximately constant over a long distance, and that despite the larger end radius, the maximum slope hardly differs from that of R1. The constant slope of the shoulder is a sign of a stable forming process.

Comparative Example

In another forming process, rotational speed, heating temperature and temperature profile are set according to the above-explained embodiment, but the feed rate Va of the burner carriage 11 is reduced to a rate of about 3 cm/min.

Due to the reduced feed rate, a comparatively higher radial expansion rate Vr is obtained in the deformation zone 20. A maximum value Vr,max above about 6 cm/min is obtained on the basis of equations (1) to (3).

The original hollow cylinder 2 is expanded in steps into a large tube of quartz glass, wherein each forming step represents a diameter enlargement of 120 mm. The wall thickness variation of the large tube of quartz glass produced thereby is more than 1 mm per tube length meter and is inadequate for an application where high demands are made on the dimensional stability.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A method for producing a tube (22) of glass by forming a hollow cylinder (2) from the glass with a first outer diameter $D_1$ in that said cylinder, while rotating about a rotation axis (6), is softened in portions in a heating zone (20) which is moved at a relative feed rate Va, and the softened portion is radially expanded under an action of a centrifugal force and/or of an internal overpressure applied in a bore (7) of the hollow cylinder (2) so as to form a deformation zone (30), and the tube (22) is continuously shaped with a second outer diameter $D_2$ which is greater than the first outer diameter $D_1$, wherein the radial expansion of the softened portion is carried out at a location-dependent radial expansion rate Vr, a profile of which along the deformation zone has a maximum value Vr,max which is smaller than 2 times the relative feed rate Va.

2. The method according to claim 1, wherein the maximum value Vr,max of the radial expansion rate is smaller than 1.5 times and particularly preferably smaller than 0.7 time, the relative feed rate Va.

3. The method according to claim 1, wherein, in the heating zone (20), a temperature profile is generated that along at least a sub-length of the deformation zone (30) has a course opposite to a profile of a tangential tension along the same sub-length.

4. The method according to claim 1, wherein a temperature at an end of the deformation zone (30) is lower than a temperature at a beginning of the deformation zone.

5. The method according to claim 3, wherein the heating zone (20) has a front heating portion assigned to the beginning of the deformation zone (30) and a rear heating portion assigned to the end of the deformation zone (30), wherein a higher temperature is produced by the front heating portion on a surface of the deformation zone (30) than by the rear heating portion.

6. The method according to claim 1, further comprising at least one compression phase during which a ratio of a speed at which the hollow cylinder (2) moves into the heating zone (20) and of a speed at which the tube (22) is removed from the heating zone (20) is smaller than 1.

7. The method according to claim 1, wherein the maximum radial expansion rate Vr,max is smaller than 20 cm/min, preferably smaller than 10 cm/min.

8. The method according to claim 1, wherein a blow pressure is set to less than 20 mbar, preferably to less than 10 mbar.

9. The method according to claim 1, wherein the tube (22) is produced with the second outer diameter $D_2$ which is greater than the first outer diameter $D_1$ by at least 40 mm.

* * * * *